J. W. HAAS.
PROCESS FOR MANUFACTURING CREAM-TARTAR.

No. 172,999. Patented Feb. 1, 1876.

Witnesses:

Inventor:

UNITED STATES PATENT OFFICE.

JULIUS W. HAAS, OF DUBUQUE, IOWA.

IMPROVEMENT IN PROCESSES FOR MANUFACTURING CREAM TARTAR.

Specification forming part of Letters Patent No. 172,999, dated February 1, 1876; application filed October 1, 1875.

*To all whom it may concern:*

Be it known that I, JULIUS W. HAAS, of the city and county of Dubuque and State of Iowa, have invented a new and useful Process and Method in the Manufacture of Bitartrate of Potash, popularly known as "Cream of Tartar;" and do hereby declare that the following is a full, clear, and exact description thereof, reference being had to the accompanying drawings, making a part of this specification.

Figure 1:
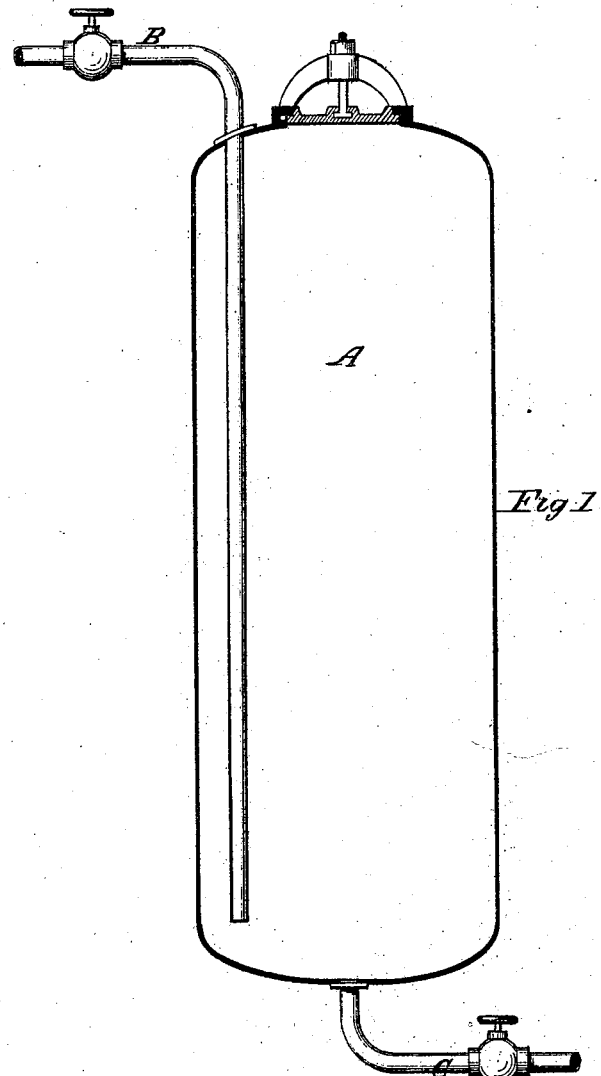
Figure 2:
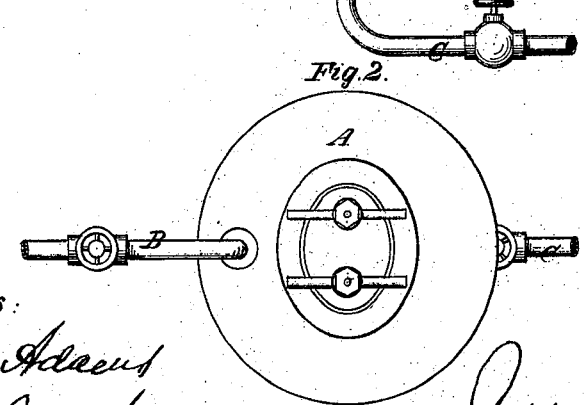

Figure 1 represents a vertical section of the copper cylinder used in the process with steam and exhaust pipes. Fig. 2 represents a transverse section thereof, and showing the top and man-hole.

I use in my process a copper cylinder placed and maintained in an upright position, A. This cylinder may be of any size, but one of the following dimensions will be found of convenient size, to wit: three (3) feet diameter by twelve (12) feet in length. At the top of the cylinder is a man-hole of sufficient size to allow easy ingress and egress, and made steam-tight, and secured so as to be capable of sustaining the requisite degree of pressure hereinafter mentioned.

A steam-pipe, B, leading directly from the boiler, passes through the top of the cylinder, and is continued nearly to the bottom. From the bottom of the cylinder another pipe, C, extends for the purpose of exhausting and conducting away the "mother-water" after the crystallization of the cream of tartar has taken place.

The advantages and merits of my process over any and all other methods now in use are that, by my process, a much larger percentage or proportion of the "argols," can be and are dissolved. The crystals obtained are larger and finer. The product of the cream of tartar is larger and chemically pure, and all further processes for the purpose of eliminating impurities are rendered unnecessary, and a perfectly pure bitartrate of potassa is produced at much less expense and cost than the ordinary cream of tartar. By all other methods of manufacturing the bitartrate of potassa, a large amount of the tartrate of lime ($C^4H^4CaO^6$) is contained in the product, and left in the residuum.

Having described the apparatus and some of the advantages of my process, I will now proceed to describe the same.

The argols, after being ground are placed in the cylinder A, the quantity depending on the size of the cylinder—about eleven hundred pounds (1100) in one of the dimensions above given—to which are added the requisite equivalents of hydrochloric acid (H Cl) chemically pure, of thirty per cent. gravity, and chloride of potassa (K Cl.) The cylinder is filled with water, and closed so as to be steam-tight.

The following formula expresses the chemical changes and reactions produced, and taking place under a pressure of steam of the requisite degree continued for three (3) hours:

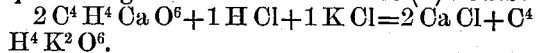

$$2\,C^4H^4CaO^6 + 1\,HCl + 1\,KCl = 2\,CaCl + C^4H^4K^2O^6.$$

The steam is then turned off, and the cylinder and contents allowed to remain till the crystallization of the bitartrate of potassa is complete, which usually takes about three (3) days. The mother-water is then drained off through the pipe C into another cylinder, charged as the above, with the addition of water sufficient to fill the same. By this means all undissolved tartrate of lime and uncrystallized bitartrate of potassa are saved and utilized. The crystals of bitartrate of potassa deposited in the cylinder, and the insoluble and foreign matter at the bottom can then be removed. This product of bitartrate of potassa is chemically pure. By adding the necessary amount of animal charcoal when the argols are placed in the cylinder all coloring matter will be removed.

It will be observed that this process differs essentially from those hitherto employed, in that I do not effect the solution of the argols by ordinary boiling, nor by heating by means of a steam-jacket. By either of these methods, which are the only ones now in use, a much longer time is required to effect the solution of the argols, and the requisite chemical changes.

What I claim as my invention is—

The process, hereinbefore described, of manufacturing cream of tartar, the same consisting in treating the argols, after being ground and placed in a steam-tight vessel, with pure hydrochloric acid, chloride of potassa, and water, and subjecting the whole to the action of compressed or superheated steam for about three hours, and then allowing the solution to stand till the crystallization of the bitartrate of potassa is complete, all substantially in the manner described.

JULIUS W. HAAS.

Witnesses:
  M. H. BEACH,
  LOUIS G. HURD.